(12) United States Patent
Rueb

(10) Patent No.: US 10,239,178 B2
(45) Date of Patent: Mar. 26, 2019

(54) LASER PROJECTOR WITH DYNAMICALLY ADAPTABLE FOCUS

(71) Applicant: Virtek Vision International ULC, Waterloo (CA)

(72) Inventor: Kurt D. Rueb, Kitchner (CA)

(73) Assignee: Virtek Vision International, ULC, Waterloo, Ontario (CA)

( * ) Notice: Subject to any disclaimer, the term of this patent is extended or adjusted under 35 U.S.C. 154(b) by 0 days.

(21) Appl. No.: 15/784,720

(22) Filed: Oct. 16, 2017

(65) Prior Publication Data

US 2018/0109770 A1    Apr. 19, 2018

Related U.S. Application Data

(60) Provisional application No. 62/408,944, filed on Oct. 17, 2016.

(51) Int. Cl.
| | |
|---|---|
| *G02B 27/09* | (2006.01) |
| *B23Q 17/24* | (2006.01) |
| *G01B 11/00* | (2006.01) |
| *G01C 11/04* | (2006.01) |
| *G06T 7/521* | (2017.01) |

(Continued)

(52) U.S. Cl.
CPC ..... *B23Q 17/2423* (2013.01); *B23Q 17/2404* (2013.01); *B23Q 17/249* (2013.01); *G01B 11/002* (2013.01); *G01B 11/2513* (2013.01); *G01B 11/2518* (2013.01); *G01C 11/02* (2013.01); *G01C 11/04* (2013.01); *G02B 26/0825* (2013.01); *G02B 26/105* (2013.01); *G06T 7/521* (2017.01); *H04N 9/317* (2013.01); *H04N 9/3129* (2013.01); *H04N 9/3155* (2013.01); *H04N 9/3194* (2013.01); *B23Q 2717/00* (2013.01); *G06T 2207/10028* (2013.01); *G06T 2207/10152* (2013.01);

(Continued)

(58) Field of Classification Search
CPC .............. B23Q 17/2423; B23Q 17/249; B23Q 2717/00; H04N 9/317; H04N 13/0203; H04N 13/204; G02B 26/105; G02B 26/0825

See application file for complete search history.

(56) References Cited

U.S. PATENT DOCUMENTS 9,200,899 B2    12/2015 Rueb
9,304,305 B1 *   4/2016 Paul .................... G02B 15/163
(Continued)

*Primary Examiner* — Behrooz M Senfi
(74) *Attorney, Agent, or Firm* — Miller Canfield Paddock Stone

(57) ABSTRACT

A laser projector assembly for projecting a template onto an object is provided. The laser projector assembly includes a frame, a laser source for generating a laser beam being affixed to said frame, a sensor assembly, a lens assembly and a galvanometer assembly. The sensor assembly is affixed to said frame for identifying surface locations of three dimensional objects. The lens assembly includes a tunable lens for changing a focus of the laser beam received from said laser source. The galvanometer assembly redirects the laser beam received from said lens assembly along a scanning path. The lens is disposed in a fixed location relative to said sensor assembly and is tunable in response to the surface locations of the three dimensional objects identified along the scanning path of the laser beam by said sensor assembly.

20 Claims, 3 Drawing Sheets

(51) Int. Cl.
*G01B 11/25* (2006.01)
*G01C 11/02* (2006.01)
*G02B 26/08* (2006.01)
*G02B 26/10* (2006.01)
*H04N 9/31* (2006.01)
*H04N 13/204* (2018.01)
*H04N 13/254* (2018.01)
*H04N 13/239* (2018.01)

(52) U.S. Cl.
CPC ......... *H04N 13/204* (2018.05); *H04N 13/239* (2018.05); *H04N 13/254* (2018.05)

(56) References Cited

U.S. PATENT DOCUMENTS

| | | | |
|---|---|---|---|
| 2010/0053745 A1* | 3/2010 | Sander | G02B 21/22 359/389 |
| 2012/0154784 A1* | 6/2012 | Kaufman | G01B 11/2518 356/4.01 |
| 2014/0210996 A1 | 7/2014 | Rueb | |
| 2016/0223319 A1* | 8/2016 | Munro | G01B 11/2518 |
| 2017/0276471 A1* | 9/2017 | Jiang | G01B 11/005 |

\* cited by examiner

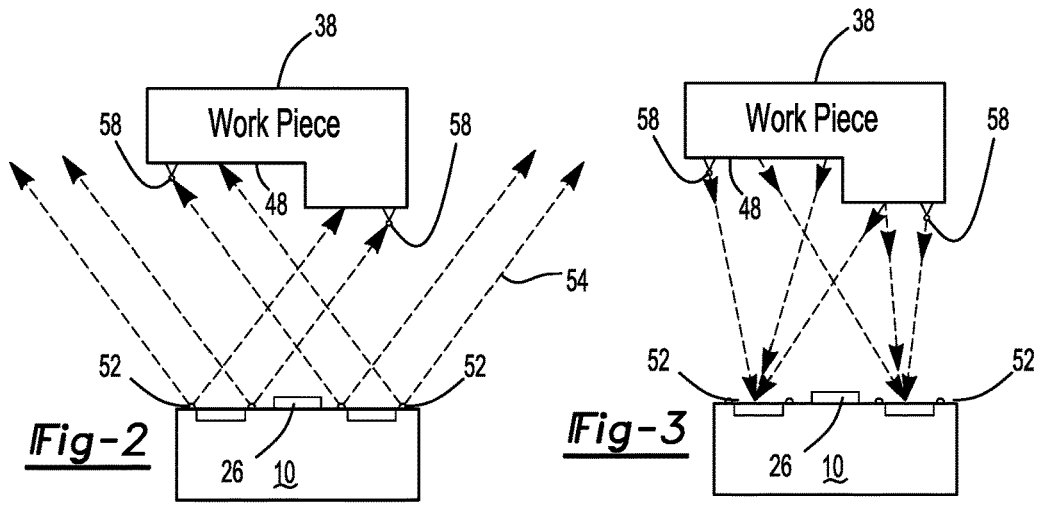
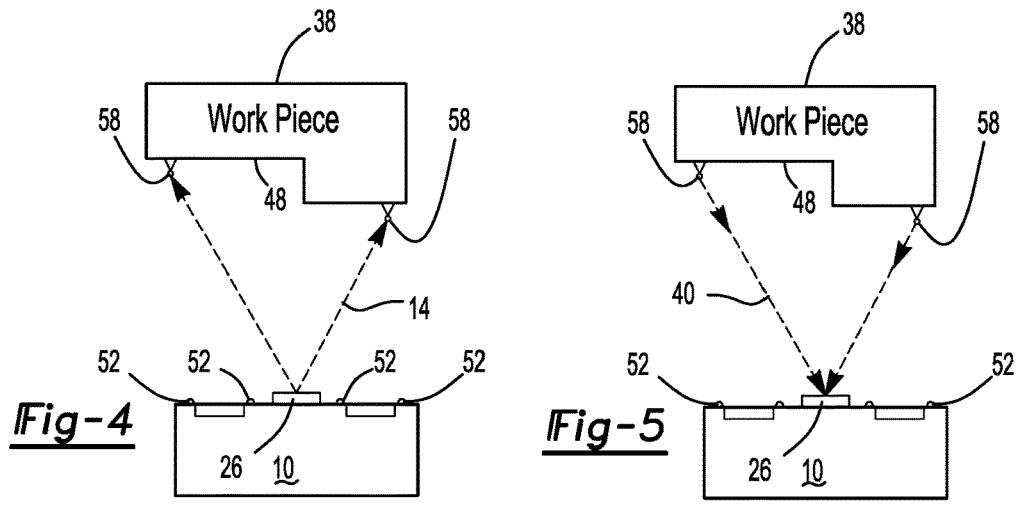
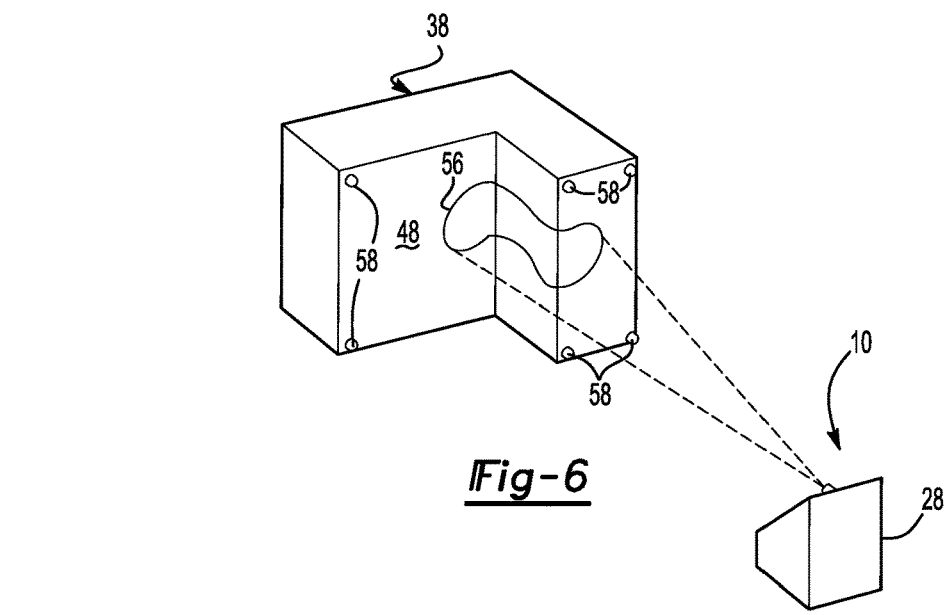

LASER PROJECTOR WITH DYNAMICALLY ADAPTABLE FOCUS

PRIOR APPLICATIONS

The present application claims priority to U.S. Provisional Application No. 62/408,944 filed on Oct. 17, 2016, the contents of which are incorporated herein by reference.

TECHNICAL FIELD

The present invention relates generally toward an improved assembly for projecting laser templates. More specifically, the present invention relates toward an integrated laser projector and locating assembly for projecting high-precision laser templates onto a work surface.

BACKGROUND

Ever increasing manufacturing tolerances have required improvements in manufacturing techniques. One such improvement is the projection of laser templates onto a work surface for directing a manufacturing process. This technique has allowed for manufacturing products at tolerances not previously achievable. However, restrictions to existing technology have limited a broader use of laser-projected images in industrial applications. For example, projecting a template onto a three-dimensional surface has proven difficult due to the inability to rapidly identify the three-dimensional work surface and to focus the laser beam onto the three-dimensional work surface in a precise manner, all while operating in a manufacturing environment.

Various locating assemblies have been implemented to improve accuracy of laser projection, reduce cost, and provide rapid adjustments to a projected laser template as are disclosed in U.S. Pat. No. 9,200,899, which is incorporated herein by reference. While this patent solved many of the problems associated with locating a laser projector relative to a workpiece and a photogrammetry assembly, it did not provide modularity Providing a modular assembly meeting the demands of modern manufacturing environments has proven elusive. Serviceability of projector assemblies, particularly of unsophisticated modular assemblies, has also proven elusive. Still further, rapid adjustment of a focus of a laser beam over a three-dimensional work service in response to dynamic movement associated with a manufacturing environment has also proven elusive.

Therefore, it would be desirable to provide a modular laser projector assembly that is serviceable, yet provides the benefits of rapid high quality laser projection onto a complex three-dimensional surfaces.

SUMMARY

A laser projector assembly for projecting a template onto an object includes a frame. A laser source for generating a laser beam is affixed to the frame. A sensor assembly is affixed to the frame for identifying surface locations of three-dimensional objects. A lens assembly includes a tunable lens for changing a focus of the laser beam received from the laser source. A galvanometer assembly redirects the laser beam received from the lens assembly along a scanning path. The lens is disposed in a fixed location relative to the galvanometer assembly and is tunable in response to the surface locations of the three-dimensional objects identified along the scanning path of the laser beam by the sensor assembly.

The laser source of the present invention does not require precise location relative to the tunable lens, or even the photogrammetry assembly providing ease of servicing. Therefore, the laser source may be replaced for servicing without causing obsolescence or expensive alignment as is known to current laser projector assemblies. To overcome this defect, the laser beam is directed toward the tunable lens in the way of a fiber optic cable. As such, a fitting interconnecting the fiber optic cable to the lens assembly is all that is required for alignment with the lens or galvanometers. Additional benefits provided by the laser projector assembly of the present invention become more readily apparent below.

BRIEF DESCRIPTION OF THE DRAWINGS

Other advantages of the present invention will be readily appreciated, as the same becomes better understood by reference to the following detailed description when considered in connection with the accompanying drawings, wherein:

FIG. 2 shows a secondary light source transmitting light toward a work piece;

FIG. 3 shows light from the secondary light source being reflected to a photogrammetry assembly of a laser projector;

FIG. 4 shows a laser beam projected by a laser projector toward reflective targets attached to the work piece;

FIG. 5 shows the laser beam being reflected from the reflective targets attached to the work piece toward the laser projector;

FIG. 6 shows a perspective view of the workpiece having a laser template projected from the laser projector assembly.

DETAILED DESCRIPTION

Figure 1:
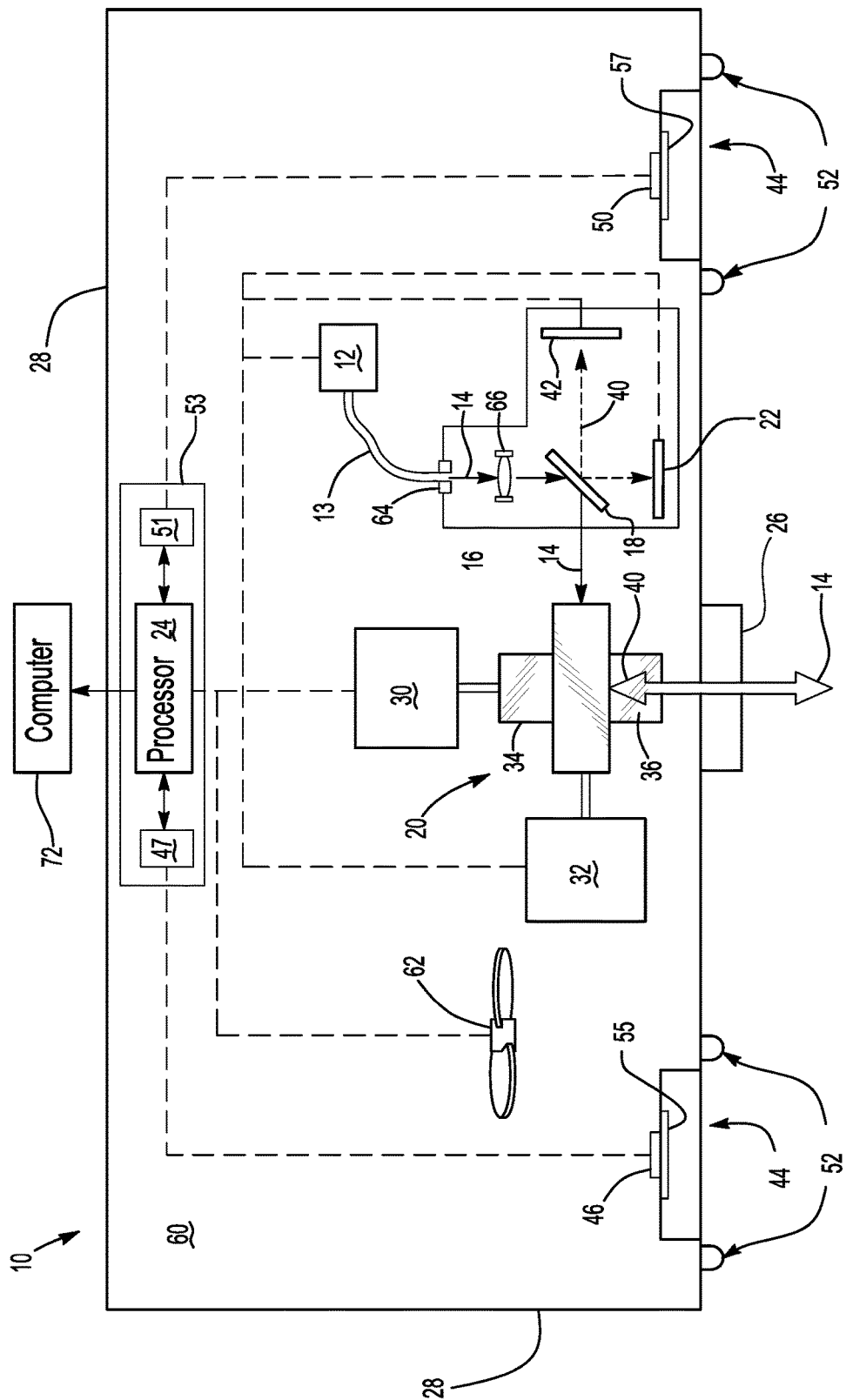
FIG. 1 shows a schematic view of the laser projector assembly of the present invention.

Referring to FIG. 1, a laser assembly of the present invention is generally shown at 10. The assembly 10 includes a laser source 12 used to generate a laser beam 14. The laser source 12 delivers the laser beam 14 through a fiber optic cable 13 to a lens 16 included in a lens assembly 15. The laser beam 14 is projected through the focusing lens 16 toward a beam splitter 18. The beam splitter 18 redirects the laser beam 14 toward a galvanometer assembly 20. The beam splitter 18 allows a portion of the laser beam 14 to pass through to a light sensor 22.

The light sensor 22 provides for reliable power output control by way of closed loop processing. As such, the light sensor 22 is connected through an analog circuit for generating a power control loop to a main processor 24. The main processor 24 is an A20 ARM processor. The main processor 24 directs necessary power adjustments to the laser source 12 to maintain desired image resolution while projecting the laser beam 14.

The galvo assembly 20 includes a first galvo motor 30 and a second galvo motor 32. The first galvo motor 30 provides pivotal movement to a first galvo mirror 34 and the second galvo motor 32 provides pivotal movement to a second galvo mirror 36. It should be understood that while the two galvo motors 30, 32 are described in this application, additional galvo motors and mirror assemblies are within the scope of this invention so that three, four, or more galvo motors may be included with a galvo assembly 20 providing variable and different projection features as desired.

The first galvo mirror 34 and the second galvo mirror 36 redirect the laser beam 14 through the output aperture 26 toward a work piece 38 as will be explained further herein below. The first galvo motor 30 and the second galvo motor 32 are electronically connected with the main processor 24 so that the main processor 24 can continuously calculate the orientation of the first galvo mirror 34 and the second galvo mirror 36 for identifying a direction to which the laser beam 14 is projected through the output aperture 26.

The first galvo mirror 34 and the second galvo mirror 36 also redirect a reflected laser beam 40 through the beam splitter 18 onto a reflected laser sensor 42. The reflected laser sensor 42 is also electronically connected to the main processor 24 so that the main processor 24 calculates an orientation of the first galvo mirror 34 and the second galvo mirror 36 at which time the reflected laser beam 40 contacts the reflected laser sensor 42. In this manner, the main processor 24 determines a direction at which the reflected laser beam 40 originates, as will be explained further herein below.

A photogrammetry assembly 44 includes a first camera 46 which is interconnected to a first photo processor 47 for transmitting an image of the work piece 38. In an alternative embodiment, a second camera 50 is electronically connected to a second photo processor 51 for generating an image of the work surface 48 with the first camera 46. Stereo imaging of the work surface 48 provides better accuracy when determining a location of the work surface 48 in a three dimensional coordinate system. The first photo processor 47 and the second photo processor 51 are dual core A20 ARM processors with integrated 5 megapixel sensors contemplated to be a direct interface CMOS sensor for capturing images locally at the photo processors 47, 51. It should also be understood that a CCD sensor may also be used, but at higher energy requirements. The first photo processor 47 and the second photo processor 51 electronically connected to the main processor 24. The main processor 24 and the first and second photo processors 47, 51 are connected to a processor board 53. Each of the processors 47, 51 are individually replaceable on the processing board 53 for servicing, as is the main processor 24. It should also be understood that the sensor assembly, as recited in the claims of the present invention, optionally includes a combination of the reflected laser sensor 42 and the first camera 46 and second camera 50, each of which include a CMOS or CCD sensor.

The main processor 24 implements video display directly as a 3-D list to allow dynamic focus adjustment and to permit motion compensation correction as disclosed in co-pending United States Patent Application Publication No. US 2014/0210996, the contents of which are incorporated herein by reference. Direct control of all camera 46, 50 functionality for recording images to the local memory of the main ARM processor module 24 are provided by the interconnection of the cameras 46, 50 through photo processors 47, 51 respectively. A first optical lens 55 is interconnected with the first camera 46 and a second optical lens 57 is interconnected to the second camera 50. The lenses 55, 57 focus a view of the work piece 38 onto the sensors providing, in one embodiment, approximately 80 degree optical field of view at a low distortion of a 4 millimeter focal length. In alternative embodiments, in particular for larger or smaller work surfaces 48, different optical fields of view may be utilized.

A secondary light source 52 to the laser source 12 provides secondary illumination 54 to the work piece 38 and to the work surface 48 38. In one embodiment, the secondary light source 52 is an LED strobe array located proximate each of the first camera 46 and the second camera 50. The secondary light source 52 generates a secondary light 54 that in one embodiment includes a similar or same wave length as the laser beam 14. Alternatively the laser beam 14 and the secondary light 54 may include different wave lengths. In still a further embodiment, the secondary light 54 may be an infrared or other non-visible light wave light, which may be desirable for continuous or seriatim flashes by the second light source 52.

Each of the components of the laser assembly 10 are mounted on a dimensionally stable frame 60 machined or formed from an aluminum or equivalent alloy known to be insensitive to temperature changes in the work space, or within the housing 28. However, a fan 62 is affixed to the housing to maintain a consistent temperature of the frame 60 and to prevent expansion associated with a temperature creep of the frame 60. In addition, the frame 60 functions as a heat sink to absorb and defuse heat energy generated by the components of the laser assembly 10. Therefore, the frame 60 provides a dimensionally stable location between the photogrammetry assembly 44 and the lens assembly 15. This reduces the need to continuously calculate a location of the photogrammetry assembly 44 within a three-dimensional coordinate system relative to the lens assembly 15 for calculating accurate laser projection, further increasing the response time for projecting the laser template 56.

As set forth above, the laser source 12 delivers the laser beam 14 to the lens assembly 15 through a fiber optic cable 13. In one embodiment, the fiber optic cable 13 maintains polarization of the laser beam 14 to facilitate efficient transmission through the beam splitter 18 to the light sensor 22. The optic cable 13 is secured to the lens assembly 15 with a coupling/mounting plate 64 interconnection. The coupling/mounting plate 64 is secured in a dimensionally stable relationship to the lens 16. Therefore, a location of the laser source 12 to the lens assembly 15 is now disassociated with respect to maintaining an accurate projection that is dependent upon the accurate location of the laser source. So long as the coupling/mounting plate 64 are disposed in a dimensionally accurate disposition relative to the lens 16, it is no longer necessary to locate the laser source 12 in a dimensionally accurate relationship with the photogrammetry assembly 44. As such, field repairs or replacement of the laser source 12 may be easily achieved without having to recalibrate or verify dimensionally accurate location of the laser source 12 relative to the photogrammetry assembly 44 to achieve desired accurate projection of the laser beam 14.

The lens 16, in one embodiment, is electrically tunable through deformation to change focal length for rapid adjustment of a focus of the laser beam 14 to maintain precise template patterns 56 on the work surface 48. The lens 16 is tuned in cooperation with the three-dimensional projection of a laser beam 14 on the three-dimensional work surface 48 as the laser assembly 10 scans the template 56 pattern for precise registration. As such, rapid focal point correction is achieved both while projecting on a three-dimensional work surface 48, but also while projecting a two-dimensional work surface.

The lens 16 of the present invention provides the ability to maintain a consistent spot size of the laser beam 14 on the work surface 48, even when a cycle time of a particular pattern template 56 includes a refresh rate of 40 Hz or higher, thus eliminating perceptual flicker common to prior art lenses. The lens 16 provides a variable focus feature rather than relying on translation of movement of a traditional lens. Modifying a focus point of the lens 16 by changing a configuration of the lens 16 enables for rapid adjustment of laser focus of the laser beam 14 even on complex three-dimensional work surfaces 48. Therefore, the lens 16 includes a reconfigurable shape for changing a focus of the laser beam received from said laser source.

In one embodiment, a principle of electro-wetting changes the boundary of two liquids having different optical density is achieved for reconfiguring the shape of the lens 16. Division of the boundary of the two liquids by way of electric current or pressure differentiation provides a rapid response as dictated by the processor 24 based upon feedback from the photogrammetry assembly 44 or the reflected light sensor 42. An alternative lens 16 having reconfigurable properties provides a polymer that changes shape when pressure is applied to the lens 16. Rapid modification of the focus of the lens 16 by changing the configuration of the shape of the lens 16 has proven to increase the precision of the template image 56, even when projected onto complex three-dimensional work surfaces 48 at a rate previously not thought attainable.

It is believed that temperature fluctuations impact the geometric configuration of the lens 16 causing a decrease in optical quality of the laser beam 14 even though focus of the laser beam 14 is instantly modified by the control circuitry in the processor 24. Temperature variations are addressed in several manners. First, temperature is continually monitored and mathematical corrections are applied to the processor 24 in response to temperature variation. To further assist rapid control and adjustment of the lens 16 configuration, an accelerometer 66 is integrated with the lens 16 to detect rapid fluctuations of the lens 16 configuration due to not only temperature fluctuation, but also from dynamic movement of the laser projection assembly 10. The accelerometer 66 identifies acceleration from movement of the lens 16 and signals the main processor 24 to rapidly respond to such movement. In addition, the photogrammetry assembly 44 provides additional sensory input as to the quality of the laser spot generated by the laser beam 14 also signaling the main processor 24 to modify the configuration of the lens 16 providing additional ability to accurately project the laser templates 66. To further adjust for temperature variations of the frame 60, the fan 62 cycles to maintain a substantially constant temperature of the frame 60. Therefore, the effect of the contraction and expansion of the frame 60 on the lens 16 is minimized.

Figure 7:
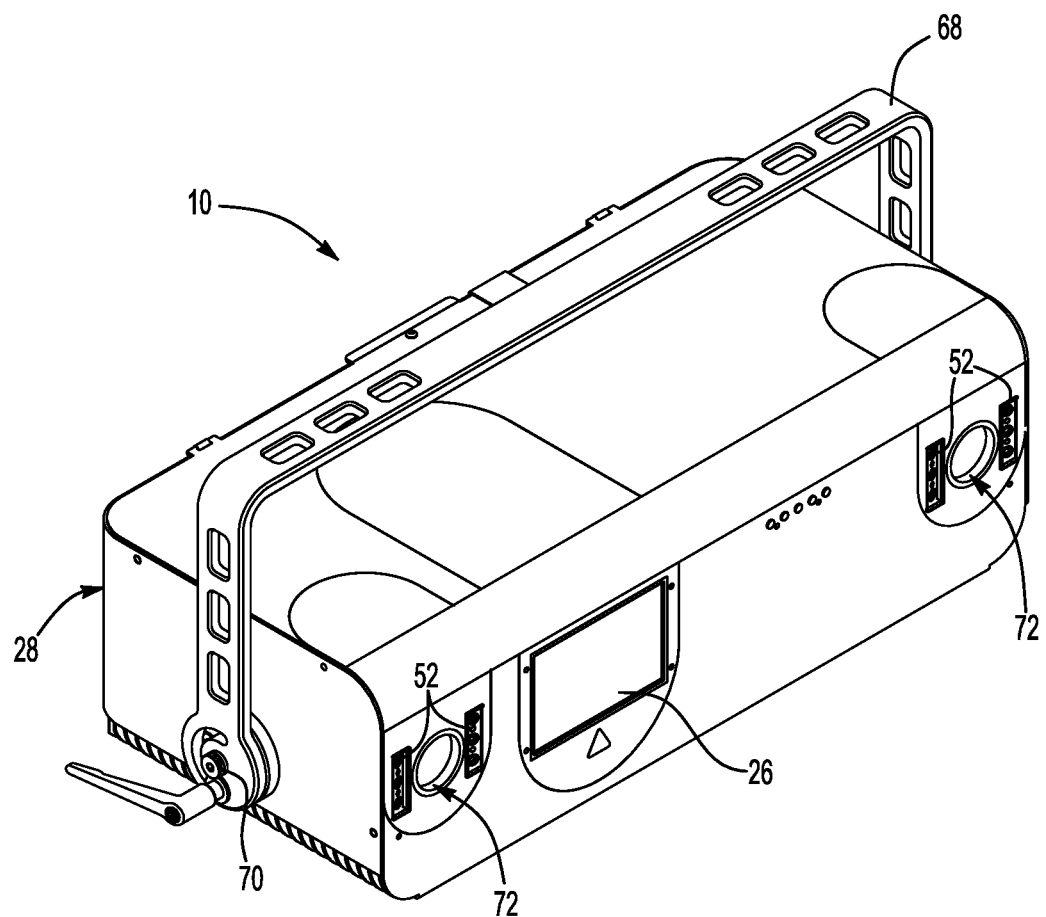
FIG. 7 shows a perspective view of the laser projection assembly of the present invention.

As best represented in FIG. 7, the housing 28 of the assembly 10 is a fully modular unit that may be mounted or placed in any desired location. The housing 28 is supported by a handle 68 that affixed to the housing 28 at pivot 70. The housing includes an upper cover 62 that defines output aperture 26 and the photogrammetry openings 72. The main processor 24 communicates via an Ethernet cable (not shown), wireless system or other method to a remote computer 74 that coordinates CAD data and communication with multiple assemblies 10, when used.

Referring to FIGS. 2-5, the method of accurately projecting the laser template 56 onto the work surface 48 will now be explained. Reflective targets 58 are affixed to the work surface 48 of the work piece 38. In one embodiment, the targets 58 are affixed to a relevant datum of a three-dimensional work surface 48 so that three-dimensional features of the work surface 58 may be precisely calculated from a location of the target 58. A plurality of targets 58 may be attached to the work surface 48 at spaced locations. In one embodiment, four targets provide enough reflective information to accurately calculate three-dimensional contours of the work surface 48. More or less targets 58 may be selected based upon a particular application.

At the beginning of an alignment cycle, the secondary light source 52 transmits the secondary light 54 toward the work piece 38. The secondary light source flashes the secondary light 54 rather than projecting secondary light 54 for an extended period of time. The photogrammetry assembly 44 receives the secondary light 54 reflected from the work surface 48 of the work piece 38 and from also reflected from the targets 58. Locating the targets 58 in a known position relative to the work surface 48, such as, for example, on datum, allows the photogrammetry assembly 44 to use the target 58 configuration to locate the three dimensional configuration of the workpiece 38 for ultimately determining a location of the three-dimensional surface 48 in a three-dimensional coordinate system. In this manner, the photogrammetry assembly 44 signals the processor 24 to calculate changes in contour defining the three-dimensional work surface 48.

As set forth above, the photogrammetry assembly 44 also detects the secondary light 54 reflected from the targets 58. The processor 24 also determines a general location of the targets 58 in the three-dimensional coordinate system when signaled by the photogrammetry assembly 44. Based upon the target 58 coordinates from the secondary light 54, the galvo motors 30, 32 orient the laser beam 14 generated by the laser source 12 to directly scan the targets 58 with the laser beam 14. As such, the processor 24 recognizes a target 54 pattern and calculates the required location to scan the targets 58 with the laser beam 14 for calculating an accurate location of the laser template 56 on the work surface 48.

Once target 58 coordinates are calculated, the laser beam 14 is projected by the laser source 12 onto the targets 58 as shown in FIG. 4. FIG. 5 shows the laser beam 14 being reflected from the targets 58 back toward the projector assembly 10 through the output opening 26. By way of retro reflection, the return laser beam 40 is redirected by the first galvo mirror 34 and the second galvo mirror 36 through the beam splitter 18 onto the reflected laser sensor 42. At which time, the reflected laser sensor 42 receives the reflected laser beam 40, the first galvo motor 30 and the second galvo motor 32 signal the processor a location from which the return laser beam 40 originates. Using the galvo motor 30, 32 orientation, the processor 24 calculates an exact location of the targets 58, and therefore, is capable of accurately projecting the laser template 56 as shown in FIG. 6.

The invention has been described in an illustrative manner, and it is to be understood that the terminology has been used as intended to be in the nature of words of description rather than of limitation. Obviously, many modifications and variations of the present invention are possible in light of the above teachings. It is, therefore, to be understood that within the specification, the reference numerals are merely for convenience, and are not to be in any way limiting, as the invention may be practiced otherwise than what is specifically described.

What is claimed is:

1. A laser projector assembly for projecting a template onto an object, comprising:
   a frame;
   a laser source for generating a laser beam being affixed to said frame;

a lens assembly including a lens having a reconfigurable shape for changing a focus of the laser beam received from said laser source;

a sensor assembly for sensing surface locations of three dimensional objects;

a galvanometer assembly for redirecting the laser beam received from said lens assembly along a scanning path; and said lens being disposed in a fixed location relative to said galvanometer assembly and said sensor assembly being cooperable with said galvanometer assembly for sensing surface location along the scanning path of the laser beam and causing the shape of said lens to be reconfigured in response to the surface locations of the three dimensional objects identified along the scanning path of the laser beam by said sensor assembly thereby adapting a focus of the laser beam when the surface location changes in three dimensions along the scanning path of the laser beam.

2. The assembly set forth in claim 1, further including a photogrammetry assembly being affixed to said frame in a dimensionally accurate location relative to said galvanometer assembly for identifying surface locations of three dimensional objects.

3. The assembly set forth in claim 1, wherein said laser beam is transmitted from said laser source to said lens assembly through an optical cable.

4. The assembly set forth in claim 1, wherein said laser optical cable is interconnected to said laser source with a cable fitting disposed in an dimensionally accurate attachment relative to said lens assembly.

5. The assembly set forth in claim 1, wherein lens assembly includes a beam splitter and said sensor assembly includes an optical sensor, said beam splitter directing a portion of the laser beam toward said optical sensor for determining output level of said laser source.

6. The assembly set forth in claim 2, wherein said lens is subject to geometric shape modification in response to the surface locations of the three dimensional objects identified along the scanning path of the laser beam by said photogrammetry assembly.

7. The assembly set forth in claim 2, wherein said photogrammetry assembly includes a first camera interconnect to a first processor and a second camera interconnected to a second processor, with said first processor and said second processor being interconnected being fixedly attached to said frame.

8. The assembly set forth in claim 7, wherein further including a third processor being electronically interconnected to said first processor and said second processor for providing display list processing and electronic communication with a host computer.

9. The assembly set forth in claim 7, wherein said first camera and said second camera are substantially accurately located relative to said lens assembly.

10. The assembly set forth in claim 7, further including an LED strobe array being cooperable with said first camera and said second camera for providing light detectable by said first camera and said second camera.

11. The assembly set forth in claim 1, wherein said frame comprises a heat sink and said frame temperature is controllable by an integrated cooling element.

12. The assembly set forth in claim 1, wherein said sensor assembly includes a reflected laser sensor for sensing the laser beam reflected from the direction of the three dimensional object for detecting the surface locations of the three dimensional objects identified along the scanning path of the laser beam.

13. A laser projector assembly for projecting a template onto a work surface of a workpiece, comprising:

a frame being substantially dimensionally stable;

a laser source for generating a template from a laser beam being affixed to said frame;

a galvanometer assembly mounted to said frame in a fixed position for redirecting the laser beam along a scanning path on the work surface thereby generating the template;

a lens assembly receiving the laser beam from said laser source and including a focusing element for focusing the laser beam onto said galvanometer assembly with said focusing element and said galvanometer assembly cooperably focusing and redirecting the laser beam in response to changes in three dimensional geometric configuration of the work surface along a scanning path of the laser beam thereby adapting a focus of the laser beam in response to the changes in three dimensional geometric configuration of the work surface; and said lens assembly and said galvanometer assembly being affixed to said frame in a dimensionally accurate disposition and a location of said laser source being disassociated from said dimensionally accurate disposition of said lens assembly and said galvanometer assembly.

14. The assembly set forth in claim 13, further including a photogrammetry assembly including a camera being mounted to said frame in a dimensionally accurate, fixed position relative to said galvanometer assembly.

15. The assembly set forth in claim 13, wherein said focusing element of said lens assembly comprises a tunable lens and reflected light sensor.

16. The assembly set forth in claim 15, wherein said tunable lens comprises a deformable lens for providing rapid adjustment of a focus of the laser beam.

17. The assembly set forth in claim 13, wherein said photogrammetry assembly includes first and second cameras for generating a stereo image of the work surface of the workpiece.

18. The assembly set forth in claim 13, wherein the laser beam is directed from said laser source to said lens assembly through a fiber optic cable having a fitting and said fitting is located in a dimensionally accurate disposition relative to said lens assembly.

19. The assembly set forth in claim 17, wherein said first camera is electronically connected to a first processor and said second camera is electronically connected to a second processor with said first processor and said second processor being fixedly attached to said frame.

20. The assembly set forth in claim 19, wherein said first processor and said second processor are electronically connected to a main processor for calculating laser beam projection location from imaging data received from said first processor and said second processor.

* * * * *